(12) United States Patent
Gray et al.

(10) Patent No.: US 7,396,891 B2
(45) Date of Patent: Jul. 8, 2008

(54) TWO-COMPONENT COATING COMPOSITION AND METHOD OF PREPARATION

(75) Inventors: Richard Thomas Gray, Levittown, PA (US); Alan Wayne Kohr, Schwenksville, PA (US); Dennis Michael Sharpe, Quakertown, PA (US); Theodore Tysak, Ambler, PA (US)

(73) Assignee: Rohm and Haas Company, Philadelphia, PA (US)

(*) Notice: Subject to any disclaimer, the term of this patent is extended or adjusted under 35 U.S.C. 154(b) by 340 days.

(21) Appl. No.: 11/050,271

(22) Filed: Feb. 3, 2005

(65) Prior Publication Data

US 2005/0137335 A1    Jun. 23, 2005

(51) Int. Cl.
*C08F 20/06*  (2006.01)

(52) U.S. Cl. .................. 526/317.1; 526/318; 526/309; 526/346

(58) Field of Classification Search .............. 526/317.1, 526/318, 309, 346
See application file for complete search history.

(56) References Cited

U.S. PATENT DOCUMENTS

| | | | |
|---|---|---|---|
| 4,150,005 A | 4/1979 | Gehman et al. | |
| 4,622,360 A | 11/1986 | Gomi et al. | |
| 5,075,370 A | 12/1991 | Kubitza et al. | |
| 5,252,696 A | 10/1993 | Laas et al. | |
| 5,331,039 A * | 7/1994 | Blum et al. | 524/507 |
| 5,468,804 A | 11/1995 | Schmalsteig et al. | |
| 5,670,600 A * | 9/1997 | Nienhaus et al. | 528/75 |
| 2002/0002235 A1 | 1/2002 | Joanicot et al. | |
| 2005/0133764 A1 | 6/2005 | Joanicot et al. | |

FOREIGN PATENT DOCUMENTS

| | | | |
|---|---|---|---|
| EP | 0 523 993 A1 * | 1/1993 | |
| EP | 367812 | 3/1995 | |
| JP | 63-243183 | * 10/1988 | |
| JP | 2000-86977 | 3/2000 | |
| JP | 2000-086977 | * 3/2000 | |

* cited by examiner

*Primary Examiner*—Ling-Sui Choi
(74) *Attorney, Agent, or Firm*—Carl P. Hemenway

(57) ABSTRACT

Aqueous coating compositions containing (1) a first polymer containing reactive functional groups with a selected level of carboxylic acid functionality and (2) a polyfunctional crosslinker agent containing functional groups that are reactive with appropriate functional groups of the first polymer, are disclosed. The two-component polymer compositions provide a combination of durability and ready removability of the final coating after curing. Two-component polymer compositions based on the first polymer containing hydroxyl functionality in addition to carboxylic acid functionality and use of a polyisocyanate as the polyfunctional crosslinker agent are especially useful as floor polish compositions.

16 Claims, No Drawings

TWO-COMPONENT COATING COMPOSITION AND METHOD OF PREPARATION

BACKGROUND

The present invention relates to the use of aqueous-based polymer compositions containing a first component bearing reactive functional groups that are post-reacted with other functional groups in a second component to promote crosslinking during application of the aqueous composition to a substrate to form a protective film. Formulated compositions of the present invention are particularly useful in polish and coating compositions where the combination of detergent resistance and removability are desirable.

Conventional polish and coating applications, where durability and toughness are important, use polymers involving metal ion crosslinking agents. For example, the use of mixed (divalent/monovalent) metal ion crosslinked polymers has provided a dramatic improvement in gloss and durability properties compared to conventional zinc ion (divalent) crosslinking chemistry.

U.S. Pat. Nos. 5,252,696, 5,468,804 and 5,670,600 disclose the use of polyisocyanates as one binder component in two-component coating compositions where the second binder components (containing hydroxyl groups) have number average molecular weights up to 50,000.

U.S. Pat. No. 4,622,360 discloses the preparation of single-component coating compositions where a polyurethane modified with carboxyl groups is crosslinked with a polyvalent metal ion before application of the coating to a substrate. EP 367,812 discloses the preparation of single-component coating compositions where a polyacrylate is polymerized in the presence of a polyisocyanate to provide crosslinking before application of the coating to a substrate.

Current, non-metal crosslinked, single-component aqueous based polymers are known to be sensitive to scratching and pad swirling from buffing and burnishing pads used to maintain the polish coating during floor maintenance procedures. The pad scratching phenomenon is believed to be due to poor film toughness. The problem addressed by the present invention is to provide a process for formulating a coating composition, particularly floor polish, that is highly durable to wear and resistant to washing with detergents, but is readily removable with stripper.

STATEMENT OF INVENTION

The present invention provides a method for preparing a coating composition comprising (A) forming an aqueous-based mixture by combining (i) a first polymer comprising, as polymerized monomer units: (a) 5 to 50 percent, based on weight of the first polymer, of a monoethylenically unsaturated monomer containing an acidic functional group selected from one or more of carboxylic, sulfonic and phosphonic groups; (b) zero up to 60 percent, based on weight of the first polymer, of a (meth)acrylic monomer containing one or more pendant reactive functional groups selected from hydroxy, thiol, and amino groups; (c) zero up to 70 percent, based on weight of the first polymer, of one or more vinylaromatic monomers; (d) 15 to 90 percent, based on weight of the first polymer, of one or more ($C_1$-$C_{20}$)alkyl (meth)acrylate ester monomers; and (e) zero up to 10 percent, based on weight of the first polymer, of one or more other copolymerizable monomers; and (ii) a polyfunctional crosslinker agent comprising pendant functional groups selected from one or more of isocyanate, carbodiimide, aziridinyl and epoxy groups; wherein, the first polymer has a number average molecular weight from greater than 50,000 up to 2,000,000; and the polyfunctional crosslinker agent is used in an amount sufficient to provide from 0.2 to 5 equivalents of pendant functional group per equivalent of corresponding pendant reactive functional group in the first polymer; and (B) applying the aqueous-based mixture to a substrate.

In a preferred embodiment, the present invention provides a method for preparing a coating composition comprising: (A) forming an aqueous-based mixture by combining (i) a first polymer comprising, as polymerized monomer units: (a) 16 to 20 percent, based on weight of the first polymer, of monoethylenically unsaturated monomer containing a carboxylic acid functional group; (b) 3 to 15 percent, based on weight of the first polymer, of a (meth)acrylic monomer containing hydroxy functional groups; (c) 20 to 50 percent, based on weight of the first polymer, of vinylaromatic monomer; and (d) 25 to 45 percent, based on weight of the first polymer, of one or more ($C_1$-$C_8$)alkyl (meth)acrylate ester monomers; and (ii) a polyfunctional crosslinker agent comprising isocyanate pendant functional groups; wherein, the first polymer has a number average molecular weight from 200,000 to 1,000,000; and the polyfunctional crosslinker agent is used in an amount sufficient to provide from 0.2 to 5 equivalents of pendant functional group per equivalent of corresponding pendant reactive functional group in the first polymer; and (B) applying the aqueous-based mixture to a substrate.

The present invention further provides an aqueous coating composition comprising: (1) a first polymer comprising, as polymerized monomer units: (a) 5 to 50 percent, based on weight of the first polymer, of a monoethylenically unsaturated monomer containing an acidic functional group selected from one or more of carboxylic, sulfonic and phosphonic groups; and (b) zero up to 60 percent, based on weight of the first polymer, of a (meth)acrylic monomer containing one or more pendant reactive functional groups selected from hydroxy, thiol, and amino groups; and (c) zero up to 70 percent, based on weight of the first polymer, of one or more vinylaromatic monomers; and (d) 15 to 90 percent, based on weight of the first polymer, of one or more ($C_1$-$C_{20}$)alkyl (meth)acrylate ester monomers; and (e) zero up to 10 percent, based on weight of the first polymer, of one or more other copolymerizable monomers; (2) a polyfunctional crosslinker agent comprising pendant functional groups selected from one or more of isocyanate, carbodiimide, aziridinyl and epoxy groups; (3) 0.1 to 15 percent, based on weight of the aqueous coating composition, of coalescing agent; (4) zero up to 10 percent, based on weight of the aqueous coating composition, of additives selected from one or more of waxes, surfactants, defoamers, leveling agents, alkali-soluble resins and plasticizers; and (5) 50 to 99 percent, based on weight of the aqueous coating composition, of water; wherein: the first polymer has a number average molecular weight from greater than 50,000 up to 2,000,000; the polyfunctional crosslinker agent is used in an amount sufficient to provide from 0.2 to 5 equivalents of pendant functional group per equivalent of corresponding pendant reactive functional group in the first polymer; the combined amount of (1) and (2) is from 10 to 90 percent, based on weight of the aqueous coating composition; and the sum of (1), (2), (3), (4) and (5) percents add up to 100 percent.

DETAILED DESCRIPTION

We have discovered that protective coatings having enhanced durability (such as detergent resistance), yet also having easy removability (such as during stripping operations), can be prepared from two-component polymer compositions based on using (1) a first polymer containing reactive functional groups with a selected level of carboxylic acid functionality and (2) post-crosslinking with a polyfunctional crosslinker agent containing functional groups that are reactive with the appropriate functional groups of the first polymer. The selected level of acid functionality in the first polymer unexpectedly provides the combination of durability and ready removability of the final coating after curing. The two-component polymer compositions of the present invention provide the easy removability characteristics of conventional single-component metal ion crosslinked floor polish compositions with the added benefit of enhanced durability, which the conventional floor polish compositions lack.

As used herein, the following terms have the designated definitions, unless the context clearly indicates otherwise. The term "alkyl (meth)acrylate" refers to either the corresponding acrylate or methacrylate ester; similarly, the term "(meth)acrylic" refers to either acrylic or methacrylic acid and the corresponding derivatives, such as esters or amides. All percentages referred to will be expressed in weight percent (%), based on total weight of polymer or composition involved, unless specified otherwise. The term "copolymer" refers to polymer compositions containing units of two or more different monomers. The following abbreviations are used herein: g=grams, L=liters, ml=milliliters, mm=millimeters, cm=centimeters, rpm=revolutions per minute. Unless otherwise specified, ranges listed are to be read as inclusive and combinable and temperatures are in degrees centigrade (° C.).

For the purposes of the present invention, the first component or first polymer (containing selected levels of carboxylic acid monomer units and optional other functional groups) will be referred to as polymer A and the second component, containing pendant functional groups reactive with selected functional groups of the first polymer (polymer A), will be referred to as polyfunctional crosslinker agent, and may also be referred to as polymer B when the polyfunctional crosslinker agent is based on a polymeric material. Protective coatings produced from the curing of the two-component polymer compositions of the present invention or produced from the curing of other polymer compositions (such as one-component polymer compositions) for comparative purposes, will be referred to as "polish films."

The polymers used as polymer A of the present invention contain, as polymerized units, from 5 to 50%, preferably from 9 to 40%, more preferably from greater than 15 up to 30% and most preferably from 16 to 20%, of one or more monoethylenically unsaturated monomers containing an acidic functional group selected from one or more of carboxylic, sulfonic and phosphonic groups. Suitable carboxylic acid monomers include monoethylenically unsaturated ($C_3$-$C_9$)carboxylic acid monomers, such as unsaturated monocarboxylic and dicarboxylic acid monomers. For example, unsaturated monocarboxylic acids include acrylic acid (AA), methacrylic acid (MAA), α-ethacrylic acid, β,β-dimethylacrylic acid, vinylacetic acid, allylacetic acid, ethylidineacetic acid, propylidineacetic acid, crotonic acid, acryloxypropionic acid and alkali and metal salts thereof. Suitable unsaturated dicarboxylic acid monomers include, for example, maleic acid, maleic anhydride, fumaric acid, itaconic acid, citraconic acid, mesaconic acid, methylenemalonic acid and alkali and metal salts thereof. Other suitable acidic monoethylenically unsaturated monomers include the partial esters of unsaturated aliphatic dicarboxylic acids (alkyl half esters); for example, the alkyl half esters of itaconic acid, fumaric acid and maleic acid wherein the alkyl group contains 1 to 6 carbon atoms (methyl acid itaconate, butyl acid itaconate, ethyl acid fumarate, butyl acid fumarate and methyl acid maleate). Preferably, the monoethylenically unsaturated ($C_3$-$C_9$)carboxylic acid monomers are selected from one or more of acrylic acid and methacrylic acid. Additional monoethylenically unsaturated monomers containing sulfonic acid or phosphonic groups include, for example, 2-acrylamido-2-methyl-1-propane-sulfonic acid, 2-methacrylamido-2-methyl-1-propane-sulfonic acid, 3-methacryl-amido-2-hydroxypropane-sulfonic acid, allylsulfonic acid, methallylsulfonic acid, allyloxybenzenesulfonic acid, methallyloxybenzenesulfonic acid, 2-hydroxy-3-(2-propenyloxy)propanesulfonic acid, 2-methyl-2-propene-1-sulfonic acid, styrene-sulfonic acid, vinylsulfonic acid, 2-sulphoethyl methacrylate, 3-sulfopropyl acrylate, 3-sulfopropyl methacrylate, sulfomethyl acrylamide, sulfomethyl methacrylamide and phosphoethyl methacrylate.

The acid functionality level of polymer A controls the ease of removability of dried films (for example, a polish film) based on using the postcrosslinked polymer compositions of the present invention. Acid levels of greater than 15% up to 25% are particularly preferred to enhance film removal and ease of film removal properties of the two-component coating compositions of the present invention in floor test evaluations. The use of excess acid functionality (greater than 50%) in polymer A is detrimental to aqueous solution resistance and scrubbing resistance (alkaline detergent solutions) of the polish film.

The polymers used as polymer A of the present invention may optionally contain, as polymerized units, from zero up to 60%, preferably from 1 to 50%, more preferably from 2 to 40% and most preferably from 5 to 20% of a (meth)acrylic monomer containing one or more pendant reactive functional groups selected from hydroxy, thiol, and amino groups. Suitable hydroxy-functional (meth)acrylic monomers include, for example, hydroxy($C_1$-$C_4$)alkyl (meth)acrylates, such as hydroxyethyl methacrylate, hydroxyethyl acrylate, hydroxypropyl methacrylate and hydroxypropyl acrylate; preferably the hydroxy-functional (meth)acrylic monomer is hydroxyethyl methacrylate (HEMA). Suitable amino-functional (meth)acrylic monomers include, for example, dimethylaminopropyl methacrylamide, dimethylaminopropyl acrylamide, dimethylaminoethyl methacrylate, dimethylaminoethyl acrylate, dimethyl-aminopropyl methacrylate and dimethylaminopropyl acrylate. Suitable thiol-functional (meth)acrylic monomers include, for example, 2-mercaptopropyl methacrylate.

When polymer A contains hydroxy-functional (meth) acrylic monomer and the polyfunctional crosslinker agent contains pendant isocyanate functional groups, polymer A typically contains, as polymerized units, from 2 to 40%, preferably from 3 to 20%, more preferably from 3 to 15% and most preferably from 5 to 10%, of hydroxy-functional (meth) acrylic monomer.

The polymers used as polymer A of the present invention contain, as polymerized units, from 15 to 90%, preferably from 20 to 65% and more preferably from 25 to 50%, of one or more ($C_1$-$C_{20}$)alkyl (meth)acrylate ester monomers. Suitable ($C_1$-$C_{20}$)alkyl (meth)acrylate ester monomers include, for example, methyl acrylate, ethyl acrylate, propyl acrylate, isopropyl acrylate, butyl acrylate, isobutyl acrylate, secondary butyl acrylate, tertiary-butyl acrylate, methyl methacrylate, ethyl methacrylate, propyl methacrylate, isopropyl methacrylate, cyclopropyl, methacrylate, butyl methacrylate and isobutyl methacrylate, hexyl and cyclohexyl methacrylate, cyclohexyl acrylate, isobornyl methacrylate, 2-ethylhexyl acrylate (EHA), 2-ethylhexyl methacrylate, octyl (meth)acrylate, decyl (meth)acrylate, isodecyl (meth)acrylate, undecyl (meth)acrylate, dodecyl (meth)acrylate (also known as lauryl (meth)acrylate), tridecyl (meth)acrylate, tetradecyl (meth)acrylate (also known as myristyl (meth)acrylate), pentadecyl (meth)acrylate, hexadecyl (meth)acrylate (also known as cetyl (meth)acrylate), heptadecyl (meth)acrylate, octadecyl (meth)acrylate (also known as stearyl (meth)acrylate), nonadecyl (meth)acrylate, eicosyl (meth)acrylate and combinations thereof. Typically, the ($C_1$-$C_{20}$)alkyl (meth)acrylate esters are ($C_1$-$C_8$)alkyl (meth)acrylate esters and preferably ($C_1$-$C_8$)alkyl acrylate esters; more preferably, the ($C_1$-$C_{20}$)alkyl (meth)acrylate esters are selected from methyl acrylate, ethyl acrylate, butyl acrylate and 2-ethylhexyl acrylate; most preferably, the acrylate esters are selected from butyl acrylate and 2-ethylhexyl acrylate. When the ($C_1$-$C_{20}$)alkyl (meth)acrylate ester is a ($C_1$-$C_8$)alkyl acrylate ester, the amount of ester in polymer A is typically from 15 to 65%, preferably from 20 to 50% and more preferably from 25 to 45%.

Polymers used as polymer A of the present invention may optionally contain, as polymerized units, from zero up to 70%, preferably from 10 to 60% and more preferably form 20 to 50%, of one or more vinylaromatic monomers. Suitable vinylaromatic monomers include, for example, styrene, α-methyl styrene and substituted styrenes, such as vinyl toluene, 2-bromostyrene, 4-chlorostyrene, 2-methoxystyrene, 4-methoxystyrene, α-cyanostyrene, allyl phenyl ether and allyl tolyl ether. When present, the vinylaromatic monomer is preferably styrene; levels of vinylaromatic monomer of at least 20% provide an enhancement of gloss characteristics and also enhance the detergent resistance of dried films of the two-component polymer compositions of the present invention.

Polymers used as polymer A of the present invention may optionally contain, as polymerized units, from zero up to 10% and preferably from zero up to 5%, of one or more other copolymerizable monomers. Suitable other copolymerizable monomers include, for example, butadiene, acrylonitrile, methacrylonitrile, crotononitrile, α-chloroacrylonitrile, ethyl vinyl ether, isopropyl vinyl ether, isobutyl vinyl ether, butyl vinyl ether, diethylene glycol vinyl ether, decyl vinyl ether, ethylene, methyl vinyl thioether and propyl vinyl thioether, esters of vinyl alcohol (such as vinyl formate, vinyl acetate, vinyl propionate, vinyl butyrate and vinyl versatate; preferably polymer A is substantially free of vinyl esters of vinyl alcohol, that is, from zero to less than 1%, more preferably from zero to less than 0.5% and most preferably from zero to less than 0.1%, based on weight of polymer A), poly(alkyleneoxide) di(meth)acrylates, butanediol acrylate, 3-chloro-2-hydroxypropyl acrylate, acetoacetoxyethyl acrylate, acetoacetoxyethyl methacrylate, acetoacetoxypropyl acrylate, acetoacetoxypropyl methacrylate, acetoacetoxybutyl acrylate, acetoacetoxybutyl methacrylate, 2,3-di(acetoacetoxy)propyl acrylate, 2,3-di(aceto-acetoxy)propyl methacrylate, allyl acetoacetate, amides of ethylenically unsaturated ($C_3$-$C_6$)carboxylic acids, amides of ethylenically unsaturated ($C_3$-$C_6$)carboxylic acids that are substituted at the nitrogen by one or two ($C_1$-$C_4$)alkyl groups, acrylamide, methacrylamide and N-methylol (meth)acryl-amide.

Particularly preferred polymer A compositions useful in the two-component coating compositions of the present invention are polymers, comprising as polymerized monomer units: (a) 16 to 20 percent, based on weight of polymer A, of monoethylenically unsaturated monomer containing a carboxylic acid functional group; (b) 3 to 15 percent, based on weight of polymer A, of a (meth)acrylic monomer containing hydroxy functional groups; (c) 20 to 50 percent, based on weight of polymer A, of vinylaromatic monomer; and (d) 25 to 45 percent, based on weight of polymer A, of one or more ($C_1$-$C_8$)alkyl (meth)acrylate ester monomers; where the polymer has a number average molecular weight from 200,000 to 1,000,000.

Polymers used as polymer A in the present invention have number average molecular weights ($M_n$) from greater than 50,000 up to 2,000,000, preferably from 100,000 to 1,500,000, more preferably from 200,000 to 1,000,000 and most preferably from 400,000 to 800,000. Number average molecular weights for polymer A are based on aqueous phase gel permeation chromatography (GPC) analysis using known polymer standards appropriate for the polymer compositions involved. The use of polymer A materials having $M_n$ less than about 50,000 result in inferior durability properties of the dried polymer films based on the two-component polymer compositions.

Polymers used as polymer A in the present invention have glass transition temperatures from zero to 120° C., preferably from 25 to 90° C., more preferably from 40 to 80° C. and most preferably from 50 to 75° C. "Glass transition temperature" or "$T_g$" as used herein, means the temperature at or above which a glassy polymer will undergo segmental motion of the polymer chain. Glass transition temperatures of a polymer can be estimated by the Fox equation (Bulletin of American Physics Society, 1 (3), p 123, 1956) as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, and $T_{g(1)}$ and $T_{g(2)}$ refer to the glass transition temperatures of the two corresponding homopolymers. For polymers containing three or more monomers, additional terms are added ($w_n/T_{g(n)}$). The $T_g$ of a polymer can also be measured by various techniques including, for example, differential scanning calorimetry (DSC).

Methods for the preparation of the aqueous dispersible polymers used as polymer A in the present invention are well known in the art. Polymer A may be selected from solution, dispersion and emulsion polymers; preferably polymer A is an emulsion polymer. The practice of emulsion polymerization is discussed in detail in D. C. Blackley, Emulsion Polymerization (Wiley, 1975). Emulsion polymers useful in the present invention may also be formulated using internally plasticized polymer emulsions (see U.S. Pat. No. 4,150,005 for further general and specific details on the preparation of internally plasticized polymer emulsions).

Conventional emulsion polymerization techniques as described above may be used to prepare emulsion polymers suitable for use in the present invention. Suitable monomers may be emulsified with anionic or nonionic dispersing agents; for example, 0.5% to 10% based on the weight of total monomers being used. Acidic monomers are water soluble and thus serve as dispersing agents which aid in emulsifying the other monomers used. A polymerization initiator of the free radical type, such as ammonium or potassium persulphate, may be used alone or in conjunction with an accelerator, such as potassium metabisulphite or sodium thiosulphate. The initiator and accelerator, commonly referred to as catalysts, may be used in proportions of 0.1% to 2%, each based on the weight of monomers to be copolymerized. The polymerization temperature is typically from ambient temperature up to 90° C.

Examples of emulsifiers suitable for emulsion polymerization include, for example, alkaline metal and ammonium salts of alkyl, aryl, alkaryl and aralkyl sulphonates, sulphates, polyether sulphates, and alkoxylated derivatives of fatty acids, esters, alcohols, amines, amides and alkylphenols.

Chain transfer agents, including mercaptans, polymercaptans and polyhalogen compounds may be used in the polymerization mixture to control molecular weight of the polymer.

Optionally, low levels of divinyl or polyvinyl monomers, for example, glycol polyacrylates, allyl methacrylate, and divinylbenzene may be used to introduce a controlled amount of gel into the emulsion particles as long as the quality of the polish film formation is not impaired.

The polyfunctional crosslinker agents used in the method of the present invention contain pendant functional groups selected from one or more of isocyanate, carbodiimide, aziridinyl and epoxy groups. Typically, the polyfunctional crosslinker agent will be a polymer (designated as polymer B).

When the functional group of the polyfunctional crosslinker agent is an isocyanate group, the isocyanate group will react with corresponding reactive functional groups in polymer A based on hydroxy or thiol functionality. When the functional group of the polyfunctional crosslinker agent is a carbodiimide group, the carbodiimide group will react with corresponding reactive functional groups in polymer A based on carboxyl functionality. When the functional group of the polyfunctional crosslinker agent is an aziridinyl or epoxy group, these groups will react primarily with corresponding reactive functional groups in polymer A based on thiol or amino functionality.

Suitable polyisocyanate, polycarbodiimide, polyyaziridinyl and polyepoxy crosslinker agents may be based on any aliphatic, aromatic (or mixture thereof) backbone polymer suitably substituted with the desired pendant functional groups. For example, the backbone polymers may be prepared by conventional vinyl polymerization or condensation polymerization reactions where the pendant functional groups are incorporated during polymer formation or by post-reaction. Typically, the amount of polyfunctional crosslinker agent (polymer B) used relative to polymer A in preparing the two-component coating compositions of the present invention will be in an amount sufficient to provide from 0.2 to 5, preferably from 0.4 to 4 and more preferably from 0.6 to 2, equivalents of isocyanate, carbodiimide, aziridinyl or epoxy functional group, per equivalent of corresponding pendant reactive functional group in polymer A. Typically, this corresponds to 1 to 90%, preferably from 5 to 75% and more preferably from 10 to 50%, of polyfunctional crosslinker agent (polymer B), based on weight of polymer A.

When the pendant functional groups of polymer B are carbodiimide, aziridinyl or epoxy groups, the backbone polymer may be based on any suitable vinyl monomer carrying the corresponding functional group (such as glycidyl methacrylate) or reactive group that is capable of post reacting to attach the carbodiimide, aziridinyl or epoxy group.

Alternatively, polyfunctional crosslinker agents based on isocyanate, carbodiimide, aziridinyl or epoxy group functionality may be derived from non-polymeric materials, as long as they are "polyfunctional" in terms of crosslinking efficacy. Suitable polyepoxide crosslinkers include, for example, ($C_4$-$C_8$)diepoxy-alkanes and diepoxyaralkanes such as, 1,2,3,4-diepoxybutane, 1,2,4,5-diepoxy-pentane, 1,2,5,6-diepoxyhexane, 1,2,7,8-diepoxyoctane, 1,4- and 1,3-divinyl-benzene diepoxides, ($C_6$-$C_{15}$)polyphenol polyglycidyl ethers (such as 4,4'-iso-propylidenediphenol diglycidyl ether (also known as bisphenol A diglycidyl ether) and hydroquinone diglycidyl ether), polyglycidyl ethers of ($C_2$-$C_6$)alkanepolyols and poly (alkylene glycols) such as, ethylene glycol diglycidyl ether, diethylene glycol diglycidyl ether, polyethyleneglycol diglycidyl ether, glycerine diglycidyl ether and triglycidyl ether, propylene glycol diglycidyl ether and butanediol diglycidyl ether, and polyglycidyl ethers of erythritol, trimethylolethane and trimethyolpropane.

Suitable polyaziridinyl crosslinkers include, for example, polyaziridinyl derivatives of ($C_2$-$C_6$)alkanepolyols such as, pentaerythritol-tris[β-(N-aziridinyl)-propionate], trimethylolpropane-tris[β-(N-aziridinyl)propionate], pentaerythritol-bis[β-(N-aziridinyl)propionate] and trimethylolpropane-bis-[β-(N-aziridinyl)-propionate].

When the pendant functional groups of the polyfunctional crosslinker agent are isocyanate groups, the crosslinkers are typically referred to as polyisocyanates, such as the water-dispersible polyisocyanates and mixtures of polyisocyanates that are commercially available, for example, from Bayer Corporation (such as Bayhydur™ XP-7063, XP-7148, and XP-7165 polyisocyanates) or from Miles Corporation. The polyfunctional crosslinker agent may be any organic polyisocyanate having free isocyanate groups that are attached to aliphatic, cycloaliphatic, aralkyl or aromatic moieties. The polyisocyanates typically have from 2 to 5, preferably from 3 to 4, isocyanate groups per molecule (referred to as [NCO] functionality) with % isocyanate group contents ranging from 10 to 25% and preferably from 12 to 20% (by weight). The polyisocyanates are typically based on derivatives of diisocyanates containing one more of isocyanurate, biuret, allophanate, urethane, uretidone and urea groups. Polyisocyanates containing urethane groups (partial urethanization) may be prepared, for example, by reacting some of the isocyanate groups with monohydric and polyhydric alcohols, particularly monovalent polyalkylene oxide polyether alcohols containing from 5 to 10, preferably 6 to 8 ethylene oxide units per molecule. U.S. Pat. No. 5,252,696 may be consulted for further general and specific details regarding suitable water-dispersible hydrophilically-modified polyisocyanates that may be used as the polyfunctional crosslinking agent. Suitable polyisocyanates include, for example, those based on derivatives of 1,4-diisocyanatobutane, 1,6-diisocyanatohexane (HDI), 1,5-diisocyanato-2,2-di-methylpentane, 2,2,4-trimethyl-1,6-diisocyanatohexane, 2,4,4-trimethyl-1,6-diisocyanatohexane, 1, 10-diisocyanatodecane, 1,3-diisocyanatocyclohexane, 1,4-diisocyanatocyclohexane, 1-isocyanato-3,3,5-trimethyl-5-isocyanatomethylcyclohexane (isophorone diisocyanate, IPDI), 4,4'-diisocyanatodicyclohexylmethane, triisocyanates (such as 2,4,4'-triisocyanatodiphenyl ether, 4,4',4"-triisocyanatotriphenylmethane and trimeric 1,6-diisocyanatohexane) and dimeric 1,6-diisocyanatohexane. Preferably the polyisocyanates used as the polyfunctional crosslinker agent (polymer B) are based on hydrophilically-modified derivatives of 1,6-diisocyanatohexane.

Additional polyisocyanates, include, for example, those based on aromatic diisocyanates such as 2,4- and 2,6-tolylene diisocyanate, m-phenylene diiso-cyanate, xylylene diisocyanate, 4,4'-biphenylene diisocyanate, 1,5-naphthylene diisocyanate; preferably the polyisocyanates used as the polyfunctional crosslinker agent are substantially free of aromatic isocyanate derivatives, that is, from zero to less than 5%, more preferably from zero to less than 1% and most preferably from zero to less than 0.5%, based on weight of polyfunctional crosslinker agent.

If insufficient isocyanate functionality is used in the polyfunctional crosslinker agent in relation to the hydroxyl-functional polymer A, that is, less than 0.2 equivalent [NCO] in polyfunctional crosslinker agent per equivalent [OH] in polymer A, properties such as detergent resistance, black heel and scuff mark resistance, mar resistance, and responsiveness to floor machine maintenance procedures of the dried film may be diminished. More specifically, detergent resistance of the polish film is poor when excessive polish film swelling occurs, decreasing the cohesive strength of the polish film. The mechanical process of detergent scrubbing of a floor polish is then detrimental to the integrity of the polish film.

The present invention provides for crosslinking and ambient curing of aqueous-based film-forming polymers containing carboxyl groups and reactive functional groups (preferably hydroxyl groups) that are post-reacted with a polyfunctional crosslinking agent (preferably a polyisocyanate). Polish and coating compositions prepared by the method of the present invention exhibit improved properties such as detergent resistance, scuff mark resistance, mar resistance and resistance to pad induced scratching from machine maintenance operations. Additionally, aqueous-based polish and coatings compositions prepared by the method of the present invention exhibit removability characteristics that are equivalent to conventional metal ion crosslinked polymer systems.

The coating compositions prepared according to the present invention readily dry at temperatures as low as 10° C. and are particularly suitable for use in the flooring wood and furniture industries to provide excellent optical properties (such as surface gloss, leveling and transparency), durability and easy removability.

Preparation of aqueous two-component coating compositions by the method of the present invention involves mixing of the polyfunctional crosslinker agent with the water-dilutable poly(meth)acrylate polymer (polymer A) shortly before application (for example, zero to 48 hours, preferably zero to 12 hours). This affords reliable processing of the two-component mixture with a relatively long pot life (or processing time), that is, in a ready-to-use state. It is essential that the bulk of the crosslinking between polymer A and the polyfunctional crosslinking agent takes place after application of the aqueous-based mixture of the two-component polymer composition to a substrate; preferably at least 50% and more preferably at least 75%, of the crosslinking reaction (based on consumption of polyfunctional crosslinker agent) should take place after application of the aqueous-based mixture to a substrate in order to obtain the most desirable combination of durability and easy removability of the coating composition.

Typically, the polymer A component represents 40 to 90%, preferably 50 to 80%, based on the combined weight of polymer A and polyfunctional crosslinker agent component in the two-component coating composition. Correspondingly, the polyfunctional crosslinker agent (polymer B) component typically represents 10 to 60%, preferably 20 to 50%, based on the combined weight of polymer A and polyfunctional crosslinker agent in the two-component coating composition.

When formulated as a floor polish, the coating compositions of the present invention comprise the following components:

(a) 10 to 100 parts by solids weight of the two-component water-insoluble polymer formed by the method of the present invention;

(b) 0 to 90 parts by solids weight wax (provided as wax emulsion);

(c) 0 to 90 parts, by solids weight alkali soluble resin (ASR);

(d) 0.01 to 20 parts (based on weight of polymer solids) surfactant, defoamer, leveling agent, plasticizer and coalescent agent; and (e) water, sufficient to provide total polish solids ranging from 0.5 to 50%, preferably from 2 to 40% (typically this corresponds to 50 to 99% water, based on total weight of the coating composition).

The amount of component (a) is from 10 to 90%, preferably from 10 to 50% and more preferably from 15 to 25%, based on the combined weight of components (a), (b), (c), (d) and (e).

The amount of component (c), when present, may be up to 100%, preferably from 5 to 50% and more preferably form 3% to 25%, based on the weight of component (a). Suitable alkali-soluble resins (ASR) contain an acid functional group typically present at greater than 10% of the ASR, have weight average molecular weights below 500,000, and form aqueous solutions when the pH is adjusted between 6 to 10 (see U.S. Pat. No. 3,037,952 for further general and specific details on alkali-soluble resins).

When component (d) is a coalescent agent, the amount of coalescent agent is typically from 0.1 to 15%, preferably 2 to 10%, based on the combined weight of components (a), (b), (c), (d) and (e). Coalescent agents typically aid in the film formation of floor polishes and include, for example, ethylene glycol and propylene glycol ethers (such as diethylene glycol ethyl ether, dipropylene glycol methyl ether and tripropylene glycol methyl ether).

When component (d) is a leveling agent, the amount of leveling agent is typically from 0.1 to 15%, preferably 1 to 10%, based on the combined weight of components (a), (b), (c), (d) and (e). Leveling agents typically aid in providing smooth polish films of uniform gloss, and include, for example, tributoxy ethyl phosphate and polyethers (containing no free hydroxyl groups) capped with alkyl groups.

Conventional surfactants, defoamers, plasticizers and coalescent agents may be used in conventional amounts, depending upon the balance of performance properties desired by the formulator. Other ingredients, such as perfumes or odor-masking agents, optical brightener, dyes or colorants, biocides (such as bacteriocides and bacteriostats), may also be optionally included by the formulator.

Optionally, metal ion selected from one or more of polyvalent metal ion and monovalent alkali metal ion may be used in conjunction with polymer A in the method of the present invention. U.S. Pat. Nos. 4,517,330 and 5,149,745 may be consulted for further general and specific details on the preparation of aqueous-based emulsion polymers crosslinked with polyvalent metal ions. When used in the two-component coating compositions prepared by the method of the present invention, the amount of polyvalent metal ion and optionally a basic hydroxide or salt of an alkali metal, is from 1 to 75% of the equivalents of the acid residues in polymer A. Preferably, the polyvalent metal is a divalent metal. For example, a preferred floor polish composition is where the divalent metal ion content is from 5 to 60%, preferably from 5 to 50%, of the equivalent of the acid residues in polymer A.

Suitable polyvalent and alkali metal ions useful in the present invention are well known in the art. Suitable polyvalent metal ions include, for example zinc, cadmium, nickel, zirconium, strontium, calcium, magnesium and copper; preferably the polyvalent metal ions are selected from zinc, calcium, magnesium and zirconium. Suitable monovalent alkali metal ions include, for example, lithium, sodium and potassium ions.

The optional polyvalent metal ions are typically added to the aqueous medium of the polish composition (pH of 4 to 8)

as an aqueous slurry of the oxides, hydroxides, carbonates or bicarbonates of the corresponding metal ion, for example, $CaCO_3$, ZnO and $Mg(OH)_2$. The polyvalent metal ions may be incorporated into the two-component coating composition at any stage of its formulation. Similarly, the basic salt of the alkaline metal may be incorporated with the polyvalent metal ion at any stage of formulating the coating composition.

Some embodiments of the invention are described in detail in the following Examples. All ratios, parts and percentages are expressed by weight unless otherwise specified, and all reagents used are of good commercial quality unless otherwise specified. Abbreviations used in the Examples and Tables are listed below with the corresponding descriptions:

| | |
|---|---|
| BA = | butyl acrylate |
| MMA = | methyl methacrylate |
| AA = | acrylic acid |
| MAA = | methacrylic acid |
| HEMA = | hydroxyethyl methacrylate |
| ST = | styrene |
| [COOH] = | carboxyl concentration [equivalents] |
| [NCN] = | carbodiimide concentration [equivalents] |
| [NCO] = | isocyanate concentration [equivalents] |
| [OH] = | hydroxyl or hydoxy group concentration [equivalents] |

Test Methods

Mar Resistance: This test is based on striking the coating at a shallow angle with a hard object; in the examples provided, the object was the fingernail of the individual performing the test. This test gives an indication of how the coating will resist marring, which leads to gloss reduction of the coating.

After the coating is applied to the substrate and allowed to cure, the coated substrate is placed on a solid surface such as a table top and struck with the operator's fingernail. The operator's fingernail is kept parallel to the coated surface and the impact angle is greater than 45° from the normal of the surface, to increase the likelihood of marking the coating.

When comparing coatings, it was important that the same operator perform the test. This test was designed to distinguish relative differences.

We used the following rating system:

| Rating | Appearance |
|---|---|
| 1 - Excellent (Exc) | No perceptible marks |
| 3 - Good | Marks which appear as thin scratches (<1 mm) |
| 5 - Poor | Marks which are wide (>1 mm) |

Black Heel Mark and Scuff Resistance: The method for determining black heel and scuff resistance described in Chemical Specialty Manufacturers Association Bulletin No. 9-73 was utilized, except that commercially available rubber shoe heels were used in place of the recommended 5.08 cm (2 inch) rubber cubes. Furthermore, instead of subjectively rating the coated substrate, the percentage of the coated substrate area covered by black heel and scuff marks was determined; this was conveniently performed with transparent graph paper. A black heel mark is an actual deposition of rubber onto or into the coating, whereas a scuff mark results from physical displacement of the coating which appears as an area of reduced gloss. Scuff and black heel marks can occur simultaneously at the point where the heel impacts the substrate, that is, upon removal of a black heel mark, a scuff may be present.

Gloss: The method for determining the gloss performance of polish compositions is described in "Annual Book of ASTM Standards," Section 15, Volume 15.04, Test Procedure ASTM D 1455 (2000). A Gardner Byk Micro-Tri-Gloss meter, catalog number 4520, was used to record 60° and 20° gloss.

Recoatability: The method for determining the recoatability of water-based emulsion floor polishes is described in "Annual Book of ASTM Standards," Section 15, Volume 15.04, Test Procedure ASTM D 3153 (2000).

Water Resistance: The method for determining the water resistance of polish compositions is described in "Annual Book of ASTM Standards," Section 15, Volume 15.04, Test Procedure D 1793 (2000), and the following scale was used to rate the water resistance of the coating compositions:

| Rating | Appearance |
|---|---|
| Excellent (Exc) | No water mark or perceptible damage to coating |
| Very Good (VG) | Faint water outline |
| Good | Slight degree of film whitening |
| Fair | Film whitening with some blisters and lifting |
| Poor | Complete film failure with gross whitening/loss of adhesion |

Detergent Resistance: The method for determining detergent resistance is described in "Annual Book of ASTM Standards," Section 15, Volume 15.04, Test Procedure ASTM D 3207 (2000), except that a 1/20 dilution of Forward™ (S.C. Johnson and Sons, Inc., Racine, Wis.) in water was used as test detergent solution and a 1000 gram weight was added to the brush assembly.

Removability: The method for determining polish removability is described in "Annual Book of ASTM Standards," Section 15, Volume 15.04, Test Procedure ASTM D 1792 (2000), except a 1000 gram weight was added to the brush assembly.

Film Formation: A draw-down using 0.4 ml of the coating composition was applied by means of a 2 inch (5.08 cm) wide blade applicator (as specified in ASTM D 1436 (2000)), having a clearance of 0.008 inches (0.02 cm), to a length of 4 inches (10.16 cm) on a vinyl composition tile. Immediately after application of the polish, the tile was placed on a level surface in a refrigerator at 10° C. The dried film was rated as follows:

| Rating | Appearance |
|---|---|
| Excellent (Exc) | No crazing (no fine cracks in surface) |
| Very Good (VG) | Slight edge crazing |
| Good | Definite edge crazing |
| Fair | Definite edge crazing with very slight center crazing |
| Poor | Complete edge and center crazing |

Coating Application: The method for applying the floor polish coating to substrates for testing purposes is described in "Annual Book of ASTM Standards," Section 15, Volume 15.04, Test Procedure ASTM D 1436 (2000), Test Method B.

Floor Tests for Leveling Performance

The floor test areas were stripped of residual polish and repolished in the typical janitorial procedure as follows:

The floors were dust mopped to remove loose dirt, a 1:1 aqueous solution of commercial stripper solution ("SSS Easy Strip" Standardized Sanitation Systems, Inc., Burlington, Mass.) was applied by string mop at a rate of about 1,000 square feet/gallon (25 m²/L); after a five minute soak period the floors were scrubbed with a sixteen inch (41 cm) black stripping floor pad ("Scotch Brite" Slim Line Floor Pad, 3M Company, St. Paul, Minn.) on a 175 rpm floor machine (Howell Electric Motors, Plainfield, N.J., Model 88400-026); the stripped floors were thoroughly rinsed twice by damp mopping with clear water, and allowed to dry. The stripped floors were divided into 20 square foot (2 m²) sections perpendicular to the normal direction of floor traffic flow. To each of the sections four coats of polish to be tested were applied, with a SSS Finish Wide Band, Small cotton/rayon string mop No. 37627, at a rate of about 50 m²/L (2,000 square feet/gallon). Immediately after the spreading of each coat was completed, an "X" mark was placed in the wet polish surface by drawing the string mop diagonally from corner to corner of the test area. Each coat was allowed to dry for one hour before the next coat was applied.

Coatings were applied (4 coats) to floors composed of homogenous vinyl and vinyl composition tiles, and cured at ambient conditions. After the coatings had dried they were examined visually to determine the extent of the disappearance of the "X" compared to a comparative polish. This test was designed to distinguish relative differences in the disappearance of the "X" mark. Leveling was rated on the following scale:

| Rating | Appearance (relative to disappearance of "X" mark) |
|---|---|
| 5 | much better than the comparative |
| 4 | better than the comparative |
| 3 | equivalent to the comparative |
| 2 | worse than the comparative |
| 1 | much worse than the comparative |

Floor Wear Tests for Resistance Properties and Machine Maintenance Responsiveness The same procedure outlined for determining the leveling performance of polishes described in the test method section "Floor Tests for Leveling Performance" was used for the preparation of the floor substrate and polish application. After the coatings had cured at ambient conditions for a specific time, the floors were opened to pedestrian traffic. The floor test areas were exposed to foot traffic as well as wheeled traffic from maintenance carts, sample trays, etc. The visual gloss as well as scuffing and scratching before and after a sufficient exposure to traffic were measured. Machine burnishing maintenance was performed on the test floors in the typical janitorial fashion as described below.

The floors were dust mopped to remove loose dirt; the floors were burnished with an eighteen inch UHS Tan Buffer Pad ("Scotch Brite" Ultra High Speed Tan Buffer Pad, 3M Company, St. Paul, Minn.) on a 2000 rpm propane floor burnishing machine (Pioneer "2100" Superbuffer™ Model #SB2100, Pioneer/Eclipse Corporation, Sparta, N.C.). The test floors were exposed to two passes of the burnishing machine, five times per week, for a four week period. The visual gloss after burnishing or burnish response as well as the pad scratch resistance of the test finishes were measured on a weekly basis.

When comparing coatings for pad induced scratching from machine burnishing operations, it is important that the same operator perform the test and evaluate the response of the coating. This test is designed to distinguish relative differences.

We used the following rating system:

| Rating | Appearance |
|---|---|
| 1 - Nil | No perceptible marks |
| 3 - Slight | Marks which appear as thin (<1 mm) circular scratches |
| 5 - Moderate | Marks which are wide (>1 mm) circular scratches |

Floor Tests for Detergent Resistance and Removability Testing

Floors were prepared and polishes applied as described in the section for "Floor Tests for Leveling Performance;" testing was performed on the same floors mentioned in the "Floor Wear Tests for Resistance Properties and Machine Maintenance Responsiveness" section. For detergent resistance testing, the floors were dust mopped to remove loose dirt, a 1/3 dilution of Forward DC (S.C. Johnson & Son, Inc., Racine, Wis.) in water was charged to a floor scrubbing machine equipped with a sixteen inch (41 cm) blue scrubbing pad ("Scotch Brite" Slim Line Floor Pad, 3M Company, St. Paul, Minn.). The scrubbing operation involved two passes with the machine over the test floors. The same machine used to deposit the detergent and scrub the floors was also used to remove the detergent solution and dry the floor. The polish coatings were evaluated for film damage/removal and haze. Additionally, 20° gloss was measured to determine gloss differences before and after scrubbing.

Evaluation of the removability of the polish coating from the floor tests was performed in the identical manner outlined for preparing the floor for testing, after 24 weeks of exposure to pedestrian traffic and machine burnishing operations. The polish coatings were evaluated for film removal and ease of removal.

Unless otherwise indicated in these examples, the following terms, symbols and/or abbreviations should be understood to have the meanings shown below. The following abbreviations and terms are used as indicators of position on scales of ratings used in reporting the detergent resistance, removability, black heel mark resistance, scuff mark resistance and pad swirling resistance from machine maintenance tests reported in the Examples, where "Very Poor" is the lowest rating and "Excellent" the highest rating. For example, a 10-point scale would include the following designations:

| VP = | Very Poor |
|---|---|
| P = | Poor |
| P-F = | Poor to Fair |
| F = | Fair |
| F-G = | Fair to Good |
| G = | Good |
| G-VG = | Good to Very Good |
| VG = | Very Good |
| VG-Exc = | Very Good to Excellent |
| Exc = | Excellent |

Formulation of a Floor Polish Composition for Testing

In order to evaluate the performance of polymer A candidates (polymers containing an acidic functional group) for use in polish vehicles, the polymers were added into a standard floor polish formulation. The formulation presented below is representative of conventional floor polish formulations known to those skilled in the art. The ingredients used and their proportions and manner of addition are representative of those commonly practiced with conventional technology emulsion polymers.

Floor polish formulations based on using Part 1 alone represent single-component (single-stage or "1-pot") formulations. Floor polish formulations based on using Part 1 in conjunction with Part 2 are representative of the two-component (two-stage or "2-pot") compositions of the present invention.

The floor polish formulation was prepared by adding Part 1 to an appropriate container based on quantity needed for specific test. For example, 100 g of Part 1 was charged to a 113-ml (4-ounce) glass jar, which served as a mixing vessel. When two-component compositions were tested, Part 2 (polyfunctional crosslinking agent, polyisocyanate dispersion) was then added to the mixing vessel in an amount sufficient to react with the hydroxy functionality of polymer A in the Part 1 component. The specific amount of polyfunctional crosslinking agent used varied and is specified by the [NCO]:[OH] stoichiometric ratio in the examples below. The resultant mixture was then stirred for 5 minutes at ambient temperature.

| Part 1 (contains polymer A): (see order of addition below) | | |
|---|---|---|
| Material | Function | Amount (parts by weight) |
| Water | diluent | 50.7 |
| FC-120 (1%)[1] | wetting agent | 1.00 |
| Kathon ™ CG/ICP (1.5%)[2] | biocide | 0.03 |
| SE-21[3] | defoamer | 0.02 |
| Diethylene Glycol Ethyl Ether | coalescent | 4.5 |
| Tributoxy Ethyl Phosphate | leveling agent | 1.0 |
| Polymer A (as 38% solids emulsion) | vehicle | 30.6 |
| AC-316N (30%)[4] | Aqueous polyethylene wax emulsion | 6.9 |

[1]ammonium fluoroalkyl carboxylate (Flourad ™ 120 from 3M Co., Minneapolis, MN)
[2]isothiazolone mixture (Rohm and Haas Co., Philadelphia, PA)
[3]aqueous dispersion of polydimethylsiloxane (Wacker Silicones Corp., Adrian, MI)
[4]low molecular weight nonionic polyethylene, aqueous dispersion (Honeywell, Morristown, NJ)

Part 2 (contains polyfunctional crosslinker agent): Water-dispersible polyisocyanate based on derivatives of 1,6-diisocyanatohexane (HDI) available as Bayhydur™ XP-7148 polyisocyanate from Bayer Corporation, Pittsburgh, Pa.: 100% active ingredient, 14.4% [NCO], 3.1 average [NCO] functionality, 292 g/equivalent [NCO].

In a preferred embodiment, Part 2, containing the crosslinker agent, will also contain the leveling agent, that is, the leveling agent is not included in Part 1, but is instead added as a component of Part 2. In this case, the presence of the leveling agent in Part 2 improves the fluidity and viscosity of the Part 2 component and improves the mixing of Part 1 and Part 2 components. In addition, this mode of addition minimizes any gel formation that may occur during the mixing of Parts 1 and 2.

We have found that when the leveling agent is included in Part 2 instead of in Part 1, dual chambered storage containers can be used with Part 1 and Part 2 (containing tributoxy ethyl phosphate) without any gel formation when the two components are ultimately mixed together.

Panel Testing of Floor Polish Compositions

To vinyl composition panels, 2 coats of polish based on different Part 1/Part 2 combinations were applied (see description in the section for "Coating Application") with about one hour between coats. After the final coat, the coated panels were allowed to cure at 25° C. for 24 hours before testing. This format was used to evaluate mar, black heel mark, scuff and detergent resistance as well as polish film removability.

Experimental Test Results

Testing of Examples 1-3 demonstrates the improvement in performance properties of polish films using the two-component polymer compositions of the present invention based on a conventional aqueous-based emulsion polymer as polymer A (see U.S. Pat. No. 5,149,745 for further general and specific details on the preparation of these aqueous-based emulsion polymers). The polymer A (40 BA/6 MMA/38 ST/5 HEMA/11 MAA) emulsion further contained 5 equivalent % $Zn^{++}$ (added as ZnO, based on equivalents of MAA) and 2.2% $K^+$ (added as KOH, based on emulsion solids), with a final solids content of 38% by weight and a final pH of 7.5 (this solids level and pH adjustment was used throughout regarding polymer A emulsions, unless indicated otherwise).

EXAMPLE 1 (COMPARATIVE)

Example 1 was formulated as a test composition as described in Part 1 (see section on "Formulation of a Floor Polish Composition for Testing"), except that 30.9 grams of water was used instead of 50.7 g, to provide a final polish formulation with 20% solids. Polymer A emulsion had an [OH] equivalent weight of 6848, based on the HEMA content of polymer A.

EXAMPLE 2

Example 2 was formulated as a test composition by combining the 94.8 g of Part 1 (containing polymer A) with 5.2 g of Part 2 (polyfunctional crosslinking agent) to provide a final polish formulation with 20% solids with an [NCO]:[OH] stoichiometric ratio of 4:1.

Table 1 summarizes the performance results of Examples 1 and 2, showing that the two-component coating composition provided enhanced durability characteristics (mar, black heel mark, scuff and detergent resistance) while also providing excellent polish film removability By contrast, the single-component coating composition, while having good removability, had much poorer durability (mar and scuff) properties.

TABLE 1

| | Ex 1* | Ex 2 |
|---|---|---|
| Mar | 5 | 1 |
| Black Heel Mark Resistance (% Coverage) | 3.5 | 3.5 |
| Scuff Mark Resistance (% Coverage) | 2.9 | 2.0 |
| Gloss 60°/20° | 70/38 | 75/43 |
| Recoatability | Good | Good |
| Water Resistance | VG-Excellent | Excellent |
| Detergent Resistance | Good | Excellent |
| Removability | Excellent | Excellent |
| Film Formation | Excellent | Excellent |

*= comparative

EXAMPLE 3 (COMPARATIVE)

Example 3 was formulated as a test composition as described in Part 1, except that 30.9 g of water was added instead of 50.7 g, to provide a final polish formulation with 20% solids. Polymer A emulsion used a two-component emulsion polymer having an overall composition of 30

BA/10.5 MMA/5 HEMA/4.5 MAA/40 ST/5 MMA/5 AA and had an [OH] equivalent weight of 6848, based-on the HEMA content of polymer A (see U.S. Pat. No. 4,150,005 for further general and specific details on the preparation of these aqueous-based emulsion polymers). The polymer emulsion was adjusted to a pH 7.5 with KOH and had a final solids content of 38%.

EXAMPLE 4 (COMPARATIVE)

Example 4 was formulated as described in Example 3, except that polymer A emulsion further contained 5 equivalent % $Zn^{++}$ (added as ZnO, see U.S. Pat. No. 5,149,745 for further general and specific details on the preparation of these Zn-containing emulsion polymers).

EXAMPLE 5

Example 5 was formulated as described in Example 4, except that 50.7 g of water was added instead of 30.9 g, and the resulting Part 1 (containing polymer A) portion was combined with 5.2 g of Part 2 (polyfunctional crosslinking agent) to provide a final polish formulation with 20% solids with an [NCO]:[OH] stoichiometric ratio of 4:1.

EXAMPLE 6

Example 6 was formulated as described in Example 3, except that 50.7 g of water was added instead of 30.9 g, and the resulting Part 1 (containing polymer A) portion was combined with 5.2 g of Part 2 (polyfunctional crosslinking agent) to provide a final polish formulation with 20% solids with an [NCO]:[OH] stoichiometric ratio of 4:1.

EXAMPLE 7 (COMPARATIVE)

Example 7 was formulated as a test composition as described in Part 1, except that 30.9 g of water was added instead of 50.7 g, to provide a final polish formulation with 20% solids. Polymer A emulsion used a two-component emulsion polymer having an overall composition of 30 BA/10.5 MMA/5 HEMA/2.5 MAA//7.3 BA/4 ST/40.2 MMA/0.5 MAA and had an [OH] equivalent weight of 6848, based on the HEMA content of polymer A (see U.S. Pat. No. 4,150,005 for further general and specific details on the preparation of these aqueous-based emulsion polymers).

EXAMPLE 8 (COMPARATIVE)

Example 8 was formulated as described in Example 7, except that 50.7 g of water was added instead of 30.9 g, and the resulting Part 1 (containing polymer A) portion was combined with 5.2 g of Part 2 (polyfunctional crosslinking agent) to provide a final polish formulation with 20% solids with an [NCO]:[OH] stoichiometric ratio of 4:1.

Data in Table 2 show that the crosslinking occurring during polish film formation with the addition of the polyfunctional crosslinking agent (polyisocyanate) in the compositions of Examples 5, 6 and 8 provides dried polish films with improved mar, black heel and scuff mark resistance compared to the single-component polish compositions. Although the composition of Example 8 showed improved mar, black heel and scuff mark resistance compared to the single-component polish compositions (Examples 3, 4 and 7), it was still deficient in removability properties relative to Examples 5 and 6, which showed the combined improvement of durability and removability.

TABLE 2

|  | Ex 3* | Ex 4* | Ex 5 | Ex 6 | Ex 7* | Ex 8* |
|---|---|---|---|---|---|---|
| % Acid Monomer in Polymer A | 9.5 | 9.5 | 9.5 | 9.5 | 3 | 3 |
| Mar | 5 | 3 | 1 | 1 | 5 | 1 |
| BHMR | 5.7 | 4.1 | 3.6 | 3.5 | 5.9 | 3.5 |
| Scuff Mark | 6.5 | 4.5 | 3.9 | 4.0 | 6.2 | 4.1 |
| Gloss 60°/20° | 70/43 | 78/45 | 78/50 | 70/42 | 72/42 | 75/45 |
| Recoatability | Good | VG | VG | Good | Good | Good |
| Water Resistance | Fair | VG-Exc | Exc | Exc | Good | Exc |
| Detergent Resistance | Poor | Good | Exc | Exc | Good | Exc |
| Removability | Exc | Exc | Exc | Good | Poor | Poor |
| Film Formation | Exc | Exc | Exc | Exc | Exc | Exc |

*= comparative

EXAMPLE 9 (COMPARATIVE)

Example 9 was formulated as a test composition as described in Part 1, except that 30.9 g of water was added instead of 50.7 g, to provide a final polish formulation with 20% solids. Polymer A emulsion used a polymer having a composition of 30 BA/9 MMA/40 ST/5 HEMA/16 MAA and had an [OH] equivalent weight of 6848, based on the HEMA content of polymer A (see EP 789,063 for further general and specific details on the preparation of these aqueous-based emulsion polymers). The polymer emulsion containing Polymer A further contained 20 equivalent % $Mg^{++}$ (added as $Mg(OH)_2$) and 2.2% $K^+$ (added as KOH, based on emulsion solids), with a final solids content of 38%.

EXAMPLE 10

Example 10 was formulated as described in Example 9, except that 50.7 g of water was added instead of 30.9 g, and the resulting Part 1 (containing polymer A) portion was combined with 5.2 g of Part 2 (polyfunctional crosslinking agent) to provide a final polish formulation with 20% solids with an [NCO]:[OH] stoichiometric ratio of 4:1.

EXAMPLE 11

Example 11 was formulated as a test composition as described in Part 1, except that 30.9 g of water was added instead of 50.7 g, to provide a final polish formulation with 20% solids. Polymer A emulsion used a polymer having a composition of 40 BA/1 MMA/38 ST/5 HEMA/16 MAA and had an [OH] equivalent weight of 6848, based on the HEMA content of polymer A (see EP 789,063 for further general and specific details on the preparation of these aqueous-based emulsion polymers). The polymer emulsion containing Polymer A further contained 6.6 equivalent % $Mg^{++}$ (added as $Mg(OH)_2$) and 2.2% $K^+$ (added as KOH, based on emulsion solids), with a pH of 7.35 and a final solids content of 38%. The resulting Part 1 (containing polymer A) portion was combined with 4.48 g of Part 2 (polyfunctional crosslinking agent) to provide a final polish formulation with 20% solids with an [NCO]:[OH] stoichiometric ratio of 3.4:1.

Data in Table 3 (Examples 9-11) show that the crosslinking occurring during polish film formation with the addition of polyfunctional crosslinking agent (polyisocyanate) in the compositions of Examples 10-11 (using polymer containing 16% acid monomer functionality) provides dried polish films with improved mar, black heel, scuff mark, detergent and water resistance compared to the single-component polish composition, while maintaining the same high degree of removability observed for the single-component polish composition.

TABLE 3

|  | Ex 9* | Ex 10 | Ex 11 |
|---|---|---|---|
| Mar | 5 | 1 | 1 |
| Black Heel Mark Resistance (% Coverage) | 5.0 | 3.7 | 4.0 |
| Scuff Mark Resistance (% Coverage) | 5.5 | 1.5 | 4.5 |
| Gloss 60°/20° | 75/40 | 75/40 | 78/42 |
| Recoatability | Good | Good | Good |
| Water Resistance | VG-Exc | Excellent | Excellent |
| Detergent Resistance | Good | Excellent | Excellent |
| Removability | Excellent | Excellent | Excellent |
| Film Formation | Excellent | Excellent | Excellent |

*= comparative

EXAMPLE 12 (COMPARATIVE)

Example 12 was formulated as a test composition as described in Part 1, except that 30.9 g of water was added instead of 50.7 g, to provide a final polish formulation with 20% solids. Polymer A emulsion used a polymer having a composition of 27 BA/9 MMA/38 ST/10 HEMA/16 MAA and had an [OH] equivalent weight of 3424, based on the HEMA content of polymer A (see EP 789,063 for further general and specific details on the preparation of these aqueous-based emulsion polymers). The polymer emulsion containing Polymer A further contained 20 equivalent % $Mg^{++}$ (added as $Mg(OH)_2$) and 2.2% $K^+$ (added as KOH, based on emulsion solids), with a final solids content of 38%.

EXAMPLE 13

Example 13 was formulated as described in Example 12, except that 50.7 g of water was added instead of 30.9 g, and the resulting Part 1 (containing polymer A) portion was combined with 5.2 g of Part 2 (polyfunctional crosslinking agent) to provide a final polish formulation with 20% solids with an [NCO]:[OH] stoichiometric ratio of 2:1.

EXAMPLE 14

Example 14 was formulated as a test composition as described in Part 1, except that 30.9 g of water was added instead of 50.7 g, to provide a final polish formulation with 20% solids. Polymer A emulsion used a polymer having a composition of 24 BA/50 ST/10 HEMA/16 MAA and had an [OH] equivalent weight of 3424, based on the HEMA content of polymer A. The polymer emulsion containing Polymer A further contained 6.6 equivalent % $Mg^{++}$ (added as $Mg(OH)_2$) and 2.2% $K^+$ (added as KOH, based on emulsion solids), with a final solids content of 38%. The resulting Part 1 (containing polymer A) portion was combined with 8.6 g of Part 2 (polyfunctional crosslinking agent) to provide a final polish formulation with 20% solids with an [NCO]:[OH] stoichiometric ratio of 3.3:1.

EXAMPLE 14A

Example 14A was formulated as a test composition as described in Example 14, except that the leveling agent was not present in Part 1, and was instead included in Part 2. The resulting Part 1 (containing polymer A) portion was combined with 6.2 g of Part 2 (5.2 g of polyfunctional crosslinking agent plus 1 g of tributoxy ethyl phosphate) to provide a final polish formulation with 20% solids with an [NCO]:[OH] stoichiometric ratio of 2:1.

Table 4 summarizes the performance of Examples 12-14A based on "floor wear" testing (see "Floor Tests for Leveling Performance" and "Floor Wear Tests for Resistance Properties and Machine Maintenance Responsiveness" previously described).

TABLE 4

| Ex # | Leveling | Scuff Mark | Gloss after Machine Burnishing | Pad Scratch | Detergent Resist | Film Removal/ Ease of Removal |
|---|---|---|---|---|---|---|
| 4* | Good | Good | VG-Exc | 3 | VG | Exc/Exc |
| 12* | Good | Fair | VG-Exc | 3 | Good | Exc/Exc |
| 13 | Good | Exc | VG-Exc | 1 | Exc | Exc/Good |
| 14 | Good | Exc | VG-Exc | 1 | Exc | Exc/Good |
| 14A | Good | Exc | VG-Exc | 1 | Exc | Exc/Good |

*= comparative

The crosslinking occurring during polish film formation with the addition of polyfunctional crosslinking agent in Examples 13-14 provides the polish film with improved resistance to pad scratching from floor machine burnishing operations compared to non-polyisocyanate containing polish and the comparative zinc-containing (or magnesium-containing) single-component polish, Example 4 (Example 12). Examples 13-14 also provided much better scuff mark resistance and detergent resistance than the single-component polish composition, yet still maintaining film removability comparable to the single-component polish.

EXAMPLE 15

Example 15 was formulated as a test composition as described in Part 1A below. Polymer A emulsion used a polymer having a composition of 24 BA/50 ST/10 HEMA/16 MAA. The polymer emulsion containing Polymer A further contained 6.6 equivalent % $Mg^{++}$ (added as $Mg(OH)_2$) and 2.2% $K^+$ (added as KOH, based on emulsion solids), with a pH of 7.5 and a final solids content of 38%. The resulting Part 1A (containing polymer A) portion was combined with 9.5 g of Part 2A (polyfunctional crosslinking agent based on carbodiimide (NCN) functionality, see below) to provide a final polish formulation with a [NCN]:[COOH] stoichiometric ratio of 0.5:1.

| Part 1A (contains polymer A): (see order of addition below) | | |
|---|---|---|
| Material | Function | Amount (parts by weight) |
| Water | diluent | 55.6 |
| FC-120 (25%)[1] | wetting agent | 0.02 |
| SE-21[2] | defoamer | 0.02 |
| Diethylene Glycol Ethyl Ether | coalescent | 4.72 |
| Tributoxy Ethyl Phosphate | leveling aid | 2.0 |
| Polymer A (as 38% solids emulsion) | vehicle | 32.4 |

-continued

Part 1A (contains polymer A): (see order of addition below)

| Material | Function | Amount (parts by weight) |
|---|---|---|
| AC-316N (30%)[3] | Aqueous polyethylene wax emulsion | 7.2 |

[1] ammonium fluoroalkyl carboxylate (Flourad ™ 120 from 3M Co., Minneapolis, MN)
[2] aqueous dispersion of polydimethylsiloxane (Wacker Silicones Corp., Adrian, MI)
[3] low molecular weight nonionic polyethylene, aqueous dispersion (Honeywell, Morristown, NJ)

Part 2A (contains polyfunctional crosslinking agent): Water-dispersible multifunctional carbodiimide available as UCARLNK™ XL-29SE crosslinker from Union Carbide Corporation, Danbury, Conn.: 50% active ingredient (in propylene glycol monomethyl ether acetate solvent), 410 g/equivalent [NCN].

Table 5 shows the improvement (Example 15: two-component composition) in durability (mar, black heel mark and scuff mark resistance) while maintaining removability relative to a single-component polish composition (represented by Example 1), when the polyfunctional crosslinking agent is based on carbodiimide functionality.

TABLE 5

|  | Ex 15 | Ex 1* |
|---|---|---|
| Mar | 1 | 5 |
| Black Heel Mark Resistance (% Coverage) | 2.0 | 3.5 |
| Scuff Mark Resistance (% Coverage) | 1.5 | 2.9 |
| Gloss 60°/20° | 74/36 | 70/38 |
| Recoatability | Good | Good |
| Water Resistance | Excellent | VG-Excellent |
| Detergent Resistance | Excellent | Good |
| Removability | Excellent | Excellent |
| Film Formation | Excellent | Excellent |

*= comparative

We claim:

1. A process for preparing a coated substrate left comprising:
   (A) forming a first polymer by performing emulsion polymerization on monomers comprising
      (a) 5 to 50 percent, based on weight of the first polymer, of a monoethylenically unsaturated monomer containing an acidic functional group selected from one or more of carboxylic, sulfonic and phosphonic groups;
      (b) 1 up to 60 percent, based on weight of the first polymer, of a (meth)acrylic monomer containing one or more pendant reactive functional groups selected from hydroxy, thiol, and amino groups;
      (c) 10 to 70 percent based on weight of the first polymer, of one or more vinylaromatic monomers;
      (d) 15 to 90 percent, based on weight of the first polymer, of one or more ($C_1$-$C_{20}$)alkyl (meth)acrylate ester monomers; and
      (e) zero up to 10 percent, based on weight of the first polymer, of one or more other copolymerizable monomers;
   (B) forming an aqueous-based mixture by combining the first polymer with a polyfunctional crosslinker agent comprising pendant functional groups selected from one or more of isocyanate, carbodiimide, aziridinyl and epoxy groups;
   wherein the first polymer has a number average molecular weight from greater than 50,000 up to 2,000,000; and the polyfunctional crosslinker agent is used in an amount sufficient to provide from 0.2 to 5 equivalents of pendant functional group per equivalent of corresponding pendant reactive functional group in the first polymer, and
   (C) applying the aqueous-based mixture to a substrate.

2. The process of claim 1 wherein the first polymer comprises, as polymerized monomer units, 9 to 40 percent of the monoethylenically unsaturated monomer containing an acidic functional group, wherein the acidic functional group is a carboxyl group.

3. The process of claim 1 wherein the first polymer comprises, as polymerized units, from 2 to 40 percent of the (meth)acrylic monomer which is a hydroxy-functional monomer selected from one or more of hydroxyethyl methacrylate, hydroxyethyl acrylate, hydroxypropyl methacrylate and hydroxypropyl acrylate.

4. The process of claim 1 wherein the first polymer comprises, as polymerized units, from 2 to 40 percent of the (meth)acrylic monomer which is a amino-functional monomer selected from one or more of dimethylaininopropyl methacrylamide, dimethylaminopropyl acrylamide, dimethylaminoethyl methaciylate, diniethylaminoethyl acrylate. dimethylaminopropyl methacrylate and dimethylaminopropyl acrylate.

5. The process of claim 1 wherein the first polymer further comprises 1 to 75 percent, based on equivalents of carboxylic acid groups, of polyvalent metal ion.

6. The process of claim 1 further comprising adding to the aqueous-based mixture of step (B) from 0.1 to 15 percent, based on weight of the aqueous-based mixture, of leveling agent.

7. The process of claim 1 wherein the pendant functional group of the polyfunctional crosslinker agent is an isocyanate group in an amount sufficient to provide from 0.2 to 5 equivalents of isocyanate group per equivalent of hydroxy or thiol functional group in the first polymer.

8. The process of claim 1 wherein the pendant functional group of the polyfunctional crosslinker agent is a carbodiimide group in an amount sufficient to provide from 0.2 to 5 equivalents of carbodiimide group per equivalent of carboxylic acid functional group in the first polymer.

9. The process of claim 1 wherein the pendant functional group of the polyfunctional crosslinker agent is an epoxy or aziridinyl group in an amount sufficient to provide from 0.2 to 5 equivalent of epoxy or aziridinyl group per equivalent of amino or thiol functional group in the first polymer.

10. The process of claim 1 wherein the first polymer has a glass transition temperature of from 25 to 90° C.

11. The process of claim 1 further comprising adding to the aqueous-based mixture of step (B), from 0.1 to 15 percent, based on the weight of the aqueous-based mixture, of coalescing agent.

12. The process of claim 5 wherein the polyvalent metal ion is selected from one or more of zinc, calcium, magnesium, and zirconium.

13. The process of claim 1, wherein the emulsion polymerization is aqueous emulsion polymerization.

14. A process for preparing a coating composition comprising:
   (A) forming an aqueous-based mixture by combining:
      (i) a first polymer comprising, as polymerized monomer units:

(a) 16 to 20 percent, based on weight of the first polymer, of monoethylenically unsaturated monomer containing a carboxylic acid functional group;
(b) 3 to 15 percent, based on weight of the first polymer, of a (meth)acrylic monomer containing hydroxy functional groups;
(c) 20 to 50 percent, based on weight of the first polymer, of vinylaromatic monomer; and
(d) 25 to 45 percent, based on weight of the first polymer, of one or more $(C_1-C_8)$alkyl (meth)acrylate ester monomers; and (ii) a polyfunctional crosslinker agent comprising isocyanate pendant functional groups;

wherein, the first polymer has a number average molecular weight from 200,000 to 1,000,000; and the polyfunctional crosslinker agent is used in an amount sufficient to provide from 0.2 to 5 equivalents of pendant functional group per equivalent of corresponding pendant reactive functional group in the first polymer; and (B) applying the aqueous-based mixture to a substrate.

15. A process for preparing a coated substrate comprising:

(A) forming an aqueous-based mixture by combining:
(i) a first polymer comprising, as polymerized monomer units:
(a) 16 to 25 percent, based on weight of the first polymer, of a monoethylenically unsaturated monomer containing an acidic functional group selected from one or more of carboxylic, sulfonic and phosphonic groups;
(b) 1 up to 60 percent, based on weight of the first polymer, of a (meth)acrylic monomer containing one or more pendant reactive functional groups selected from hydroxy, thiol, and amino groups;
(c) 10 to 70 percent, based on weight of the first polymer, of one or more vinylaromatic monomers;
(d) 15 to 90 percent, based on weight of the first polymer, of one or more $(C_1-C_{20})$alkyl(meth)acrylate ester monomers; and
(e) zero up to 10 percent, based on weight of the first polymer, of one or more other copolymerizable monomers; and (ii) a polyfunctional crosslinker agent comprising pendant functional groups selected from one or more of isocyanate, carbodiimide, aziridinyl and epoxy groups;

wherein, the first polymer has a number average molecular weight from greater than 50,000 up to 2,000,000; and the polyfunctional crosslinker agent is used in an amount sufficient to provide from 0.2 to 5 equivalents of pendant functional group per equivalent of corresponding pendant reactive functional group in the first polymer; and (B) applying the aqueous-based mixture to a substrate.

16. The process of claim 15, wherein the amount of the monoethylenically unsaturated monomer containing an acidic functional group in the first polymer is 16% to 20%, based on weight of the first polymer.

* * * * *